(12) United States Patent
Karve et al.

(10) Patent No.: US 11,063,837 B2
(45) Date of Patent: Jul. 13, 2021

(54) CUSTOMIZED NETWORK LOAD-BALANCING USING MACHINE LEARNING

(71) Applicant: Cisco Technology, Inc., San Jose, CA (US)

(72) Inventors: Prathamesh R. Karve, Thane (IN); Raj N. Samant, Mumbai (IN); Sumant S. Mali, Bangalore (IN); Raveendra K. Karkala, Bangalore (IN); Gokul Bhoothanathan Kailasanatha Subramania, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 114 days.

(21) Appl. No.: 16/203,372

(22) Filed: Nov. 28, 2018

(65) Prior Publication Data

US 2020/0169472 A1 May 28, 2020

(51) Int. Cl.
| | |
|---|---|
| *H04L 12/24* | (2006.01) |
| *H04L 12/803* | (2013.01) |
| *H04L 12/26* | (2006.01) |
| *H04L 12/743* | (2013.01) |
| *H04L 12/721* | (2013.01) |

(52) U.S. Cl.
CPC .............. *H04L 41/16* (2013.01); *H04L 43/04* (2013.01); *H04L 45/38* (2013.01); *H04L 45/7453* (2013.01); *H04L 47/125* (2013.01)

(58) Field of Classification Search
CPC ......... H04L 41/16; H04L 43/04; H04L 45/38; H04L 45/7453; H04L 47/125

USPC ......................................................... 709/223
See application file for complete search history.

(56) References Cited

U.S. PATENT DOCUMENTS

| | | | | |
|---|---|---|---|---|
| 7,143,380 | B1 * | 11/2006 | Anderson | G06F 30/18 716/114 |
| 7,296,269 | B2 * | 11/2007 | Lin | G06F 9/5083 455/453 |
| 7,822,029 | B2 * | 10/2010 | Brand | H04W 40/08 370/389 |
| 7,924,796 | B2 * | 4/2011 | Vu Duong | H04L 45/26 370/338 |
| 8,644,149 | B2 * | 2/2014 | Yedavalli | H04L 45/38 370/231 |
| 9,577,939 | B2 | 2/2017 | Akella et al. | |
| 9,813,344 | B2 | 11/2017 | Basavaraja et al. | |
| 9,923,826 | B2 * | 3/2018 | Murgia | H04L 47/125 |
| 10,009,254 | B2 * | 6/2018 | Greenbaum | H04L 45/124 |
| 10,243,871 | B1 * | 3/2019 | Patel | H04L 43/0894 |

(Continued)

OTHER PUBLICATIONS

Kim et al., Bitwise Neural Networks, Proceedings of the 31st Int'l Conference on Machine Learning, 1-5, 2015 (Year: 2015).*

(Continued)

*Primary Examiner* — David P Zarka
(74) *Attorney, Agent, or Firm* — Patterson + Sheridan, LLP (57) ABSTRACT

Techniques for optimizing network traffic distribution functions at network elements are described. As described, a network element provides information about network traffic distribution at the network element to a network controller. The network controller determines optimized network control parameters using machine learning that when implemented at the network element, redistributes network traffic over various network resources.

18 Claims, 11 Drawing Sheets

(56) References Cited

U.S. PATENT DOCUMENTS

| | | | | |
|---|---|---|---|---|
| 10,506,030 | B2* | 12/2019 | Ni | G06F 11/3006 |
| 2003/0231797 | A1* | 12/2003 | Cullen | H04N 19/147 |
| | | | | 382/239 |
| 2005/0273341 | A1* | 12/2005 | Hoffesommer | G06Q 40/00 |
| | | | | 705/35 |
| 2008/0175269 | A1* | 7/2008 | Alvarez | H04L 45/16 |
| | | | | 370/468 |
| 2012/0250496 | A1* | 10/2012 | Kato | H04L 41/0668 |
| | | | | 370/216 |
| 2016/0308709 | A1* | 10/2016 | Fernandez-Palacios Gimenez | |
| | | | | H04L 41/0618 |

OTHER PUBLICATIONS

Froom et al., "Implementing Cisco IP Switched Networks (SWITCH) Foundation Learning Guide: Campus Network Architecture," Jun. 4, 2015, ciscopress.com.

Alba Xifra Porxas and Prof. Ian F. Akyildiz, Virtulization-enabled Adaptive Routing for QoS-aware Software-Defined Networks, Dec. 2014, 91 pages.

Cascone et al., "Traffic Management Applications for Stateful SDN Data Plane," managearXiv: 1506.07077v2 [cs.NI] Aug. 31, 2015, 6 pages.

Courbariaux et al, "Binarized Neural Networks: Training Neural Networks withWeights and Activations Constrained to +1 or ?1," arXiv:1602.02830v3 [cs.LG] Mar. 17, 2016, 11 pages.

* cited by examiner

CUSTOMIZED NETWORK LOAD-BALANCING USING MACHINE LEARNING

TECHNICAL FIELD

Embodiments presented in this disclosure generally relate to distributing network data flows across multiple network links at various network elements, such as switches, routers, and firewalls, according to customized distribution algorithms. More specifically, embodiments disclosed herein relate to determining and optimizing network flow distribution parameters at a network controller using network flow information provided from network elements and providing the optimized network flow distribution parameters to the network elements for implementation.

BACKGROUND

In computer implemented networks, abstraction and aggregation of resources is a common technique used to improve the performance and reliability of the resources. For example, network elements, such as routers and switches often aggregate and treat network links as a single network channel at the network element (e.g., an EtherChannel). When the network element receives data traffic, the network element then distributes the network traffic onto the various network channels, selecting a network link in the aggregated channels to utilize for a given bit of data and/or network data flow. In many cases, the decision of which resource is selected is determined by a distribution algorithm, such as a hashing technique/algorithm, running on the network element. These hashing algorithms are predefined and often function well for a specific set of network conditions, but fail to fully adapt to live and changing network traffic. For example, during the day the hashing algorithm may function well by allocating network traffic expected during the daytime working hours (e.g., business related network traffic); however, the hashing algorithm may fail to evenly allocate network resources during nighttime hours when different types of network traffic are expected (e.g., network utility traffic, etc.). Thus, a customizable and adaptable distribution algorithm is needed in order to fully and efficiently utilize network resources in handling network traffic.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method including: receiving, at a network controller, network performance parameters from a network load distributor for a network channel on a network element and extracting, from the network performance parameters, network utilization data for one or more network flows and a distribution of the one or more network flows on one or more network links of the network channel. The method also includes determining, at a learning network distribution approximation function on the network controller and using the network utilization data for the one or more network flows and the distribution of the one or more network flows, network control parameters, where the network control parameters provide an optimized distribution of the one or more network flows on the one or more network links when implemented by a network distribution approximation function at the network element and providing the network control parameters to the network element. Other embodiments of this aspect include corresponding computer systems, apparatus, and computer programs recorded on one or more computer storage devices, each configured to perform the actions of the methods.

In one embodiment, a system including one or more computer processors; and a memory containing a program which when executed by the processors performs an operation. The operation includes receiving, at a network controller, network performance parameters from a network load distributor for a network channel on a network element and extracting, from the network performance parameters, network utilization data for one or more network flows and a distribution of the one or more network flows on one or more network links of the network channel. The operation also include determining, at a learning network distribution approximation function on the network controller and using the network utilization data for the one or more network flows and the distribution of the one or more network flows, network control parameters, where the network control parameters provide an optimized distribution of the one or more network flows on the on the one or more network links when implemented by a network distribution approximation function at the network element and providing the network control parameters to the network element. Other embodiments of this aspect include corresponding computer systems, apparatus, and computer programs recorded on one or more computer storage devices, each configured to perform the actions of the methods.

In another embodiment, a method is described. The method including: compiling, at a network element, network performance parameters including network utilization data for one or more network flows and a distribution of the one or more network flows on one or more network links of a network channel; providing the network performance parameters to a network controller. The method also including receiving network control parameters from the network controller and implementing, at a network distribution approximation function of the network element, the network control parameters, where the network control parameters provide an optimized distribution of the one or more network flows on the on the one or more network links. Other embodiments of this aspect include corresponding computer systems, apparatus, and computer programs recorded on one or more computer storage devices, each configured to perform the actions of the methods.

Example Embodiments

Predefined distribution algorithms, such as hashing algorithms, fail to work efficiently in many network traffic scenarios that a live network experiences. Even if multiple distribution algorithms are defined at a network element, not every network condition can be anticipated. Indeed, current methods often require a user to determine that network traffic distribution is unbalanced and then determine one or more new distribution algorithms from a set of predefined distribution algorithms available on the network element to address new traffic patterns. As described herein, a customized and adaptable network distribution algorithm/function is determined for each network channel on various network elements so that network traffic can be efficiently distributed across the network resources during any network traffic scenario.

In general, in an abstraction scheme, such as an EtherChannel, physical network interfaces (also known as member/network links) are aggregated into a single logical interface, i.e. the EtherChannel. In the EtherChannel, individual packets in data flows can be independently mapped to network links and/or all packets belonging to one network flow can be mapped/distributed to the same member link. In general, network elements prefer network flow-based distribution to avoid packet reordering problems, which can expend network resources.

The network link through which a particular network flow passes is decided at the network element, where the network element uses flow parameters such as source (SRC) internet protocol (IP) address, destination (DST) IP address, SRC Media Access Control address (MAC), DST MAC, protocol etc. to select a network link. These parameters for a given network flow are input to a hashing function algorithm which identifies a network link number or resource ID for a path selection for the network flow. For example, the hashing function may comprise an exclusive or (XOR) function using a SRC IP address and a DST IP address with a modulus operation using the number of network links available. Where the XOR function does not take the network conditions into account. The distribution/hashing functions, described above, currently lack adaptability and provide unbalanced traffic patterns, where certain network links are overloaded/oversubscribed and other network links are underutilized. For example, since network elements prefer to distribute flows instead of individual packets, a network link may be oversubscribed by large network flows while another network link is undersubscribed with small network flows. As described herein, the network elements can offload network performance or flow data to a network controller, which in turn uses various methods, such as machine learning, to determine optimal network control parameters which, when implemented, provide the adapted distribution functions at the network elements.

Figure 1:
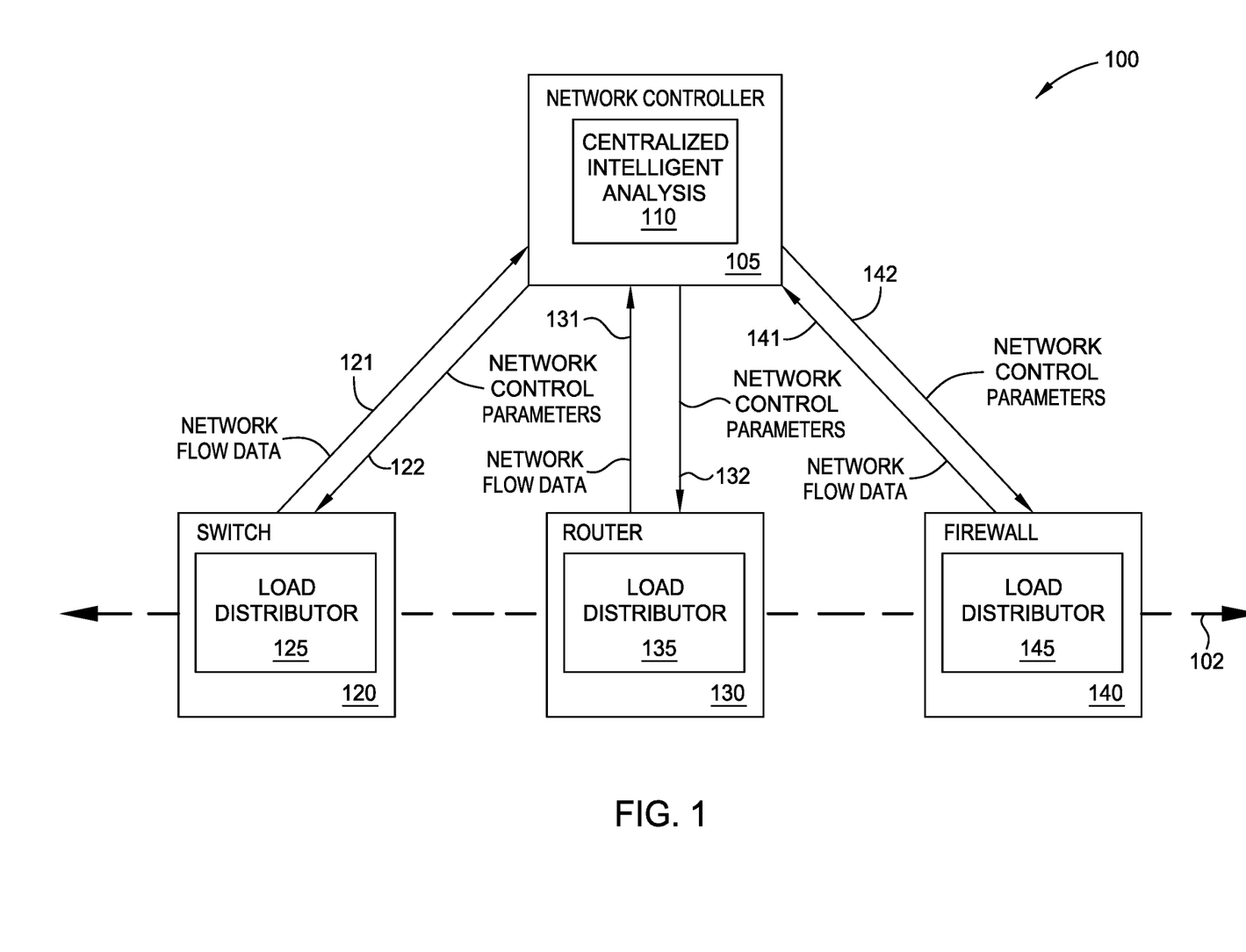
FIG. 1 illustrates a network, according to one embodiment.

Turning now to, FIG. 1 which illustrates a network, according to one embodiment. As shown, the network 100 includes the network traffic 102 which traverses the network 100 through the various network elements including a switch 120, a router 130, and firewall 140, among other network elements not shown (e.g., servers, virtual machines, etc.). Each network element includes a load distributor, including load distributors 125, 135, and 145, in a data path of the network traffic 102, where each load distributor distributes the network traffic (including network traffic flows) on the resources, (e.g., EtherChannels and network links) connected to the respective network elements. The network 100 also includes a network controller 105, which in some examples, is a software defined network (SDN) controller. The network controller 105 includes a centralized intelligent analysis module (CIAM) 110 configured to perform the methods described herein.

In some examples, the network elements offload the optimization of the distribution functions to the network controller, to preserve processing resources at the network elements. For example, the CIAM 110 receives network flow data from each of the network elements 120, 130, and 140. The network flow data is compiled for network flows at each element, including network flow data 121, 131, and 141. The CIAM 110 then determines customized network control parameters for each of the network elements and provides the network control parameters 122, 132, and 142 to the respective network elements for execution by the load distributors 125, 135, and 145. The load distributors implement/execute the network control parameters to perform a distribution function, such as a hashing function to distribute the network traffic on the network resources as described in further detail herein.

Figure 2:
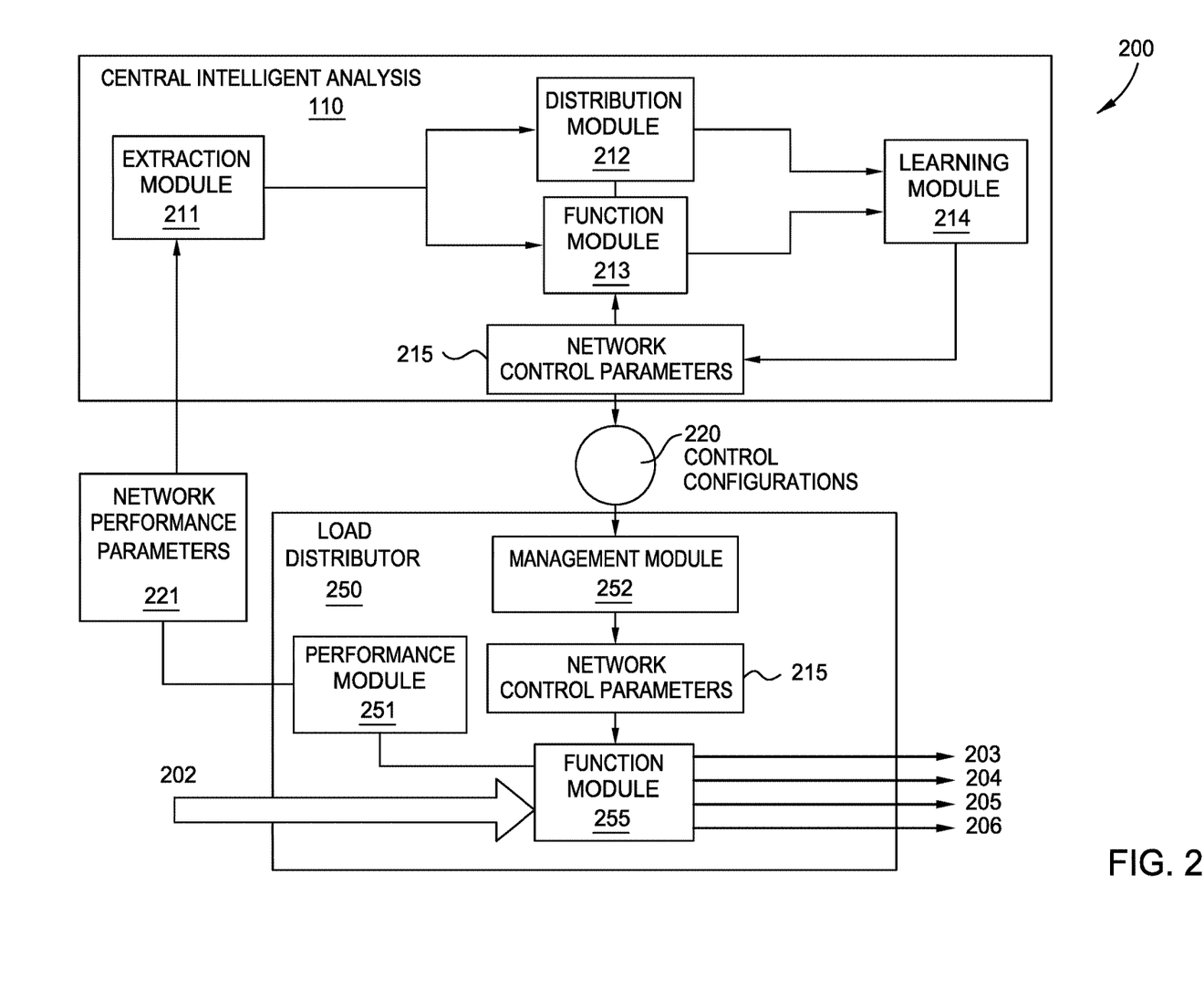
FIG. 2 is a block diagram of a system for customizable network traffic distribution, according to one embodiment.

FIG. 2 is a block diagram of a system for customizable network traffic distribution, according to one embodiment. As shown, the system 200 includes the CIAM 110 embodied on the network controller 105 shown in FIG. 1. The system 200 also includes a load distributor 250 which may be embodied as any of the load distributors 125, 135, and 145 at network elements. As shown, the system 200 includes the input network data traffic 202 and the network links 203, 204, 205, 206. The distributed data traffic includes data traffic distributed over network links represented as a single network channel (EtherChannel) at the load distributor 250. While described herein in relation to Etherchannel/network link distribution, the methods described may be utilized in any resource allocation algorithm/method. (e.g., First In First Out, Least Recently Used, Most Recently Used, Random Number, Hashing based.) As shown, the load distributor 250 includes the function module 255 which executes a distribution function, such as a hashing function algorithm, to distribute the network data traffic over the network links 203-206. The load distributor 250 also includes the performance module 251, which compiles the network flow data including the network performance parameters 221 to be sent to the CIAM 110.

The CIAM 110 includes an extraction module 211 which receives and preprocesses/extracts the network performance parameters for one or more flows such that the CIAM 110 can generate custom network control parameters using the network performance parameters. The CIAM 110 also includes a distribution module 212 which calculates/determines various distribution performance models using the extracted performance parameters and network control parameters generated by a learning module 214. The function module 213 utilizes the extracted performance parameters to generate/determine a plurality of flow distribution functions. In some examples, the function module 213 is embodied as a binary (bitwise) neural network (BNN) approximating a hashing algorithm. In some examples, the BNN acts as a low latency and low processing intensive, multi-layer feedforward neural network which approximates a distribution function, such as a hashing function. In some examples, the BNN at the function module 213 utilizes a fixed bias for a constant offset. In some examples, the input to the BNN at the function module 213 includes the extracted network control parameters (e.g., SRC IP, DST IP, port, protocol, etc.) and the output is a link number (e.g., a one-hot layer output which is high for the selected link). While described herein in relation to a BNN, other machine learning algorithms, including other neural networks, support vector machine, decision tree and/or any classifier model may be implemented as the function module 213.

Figure 3A:
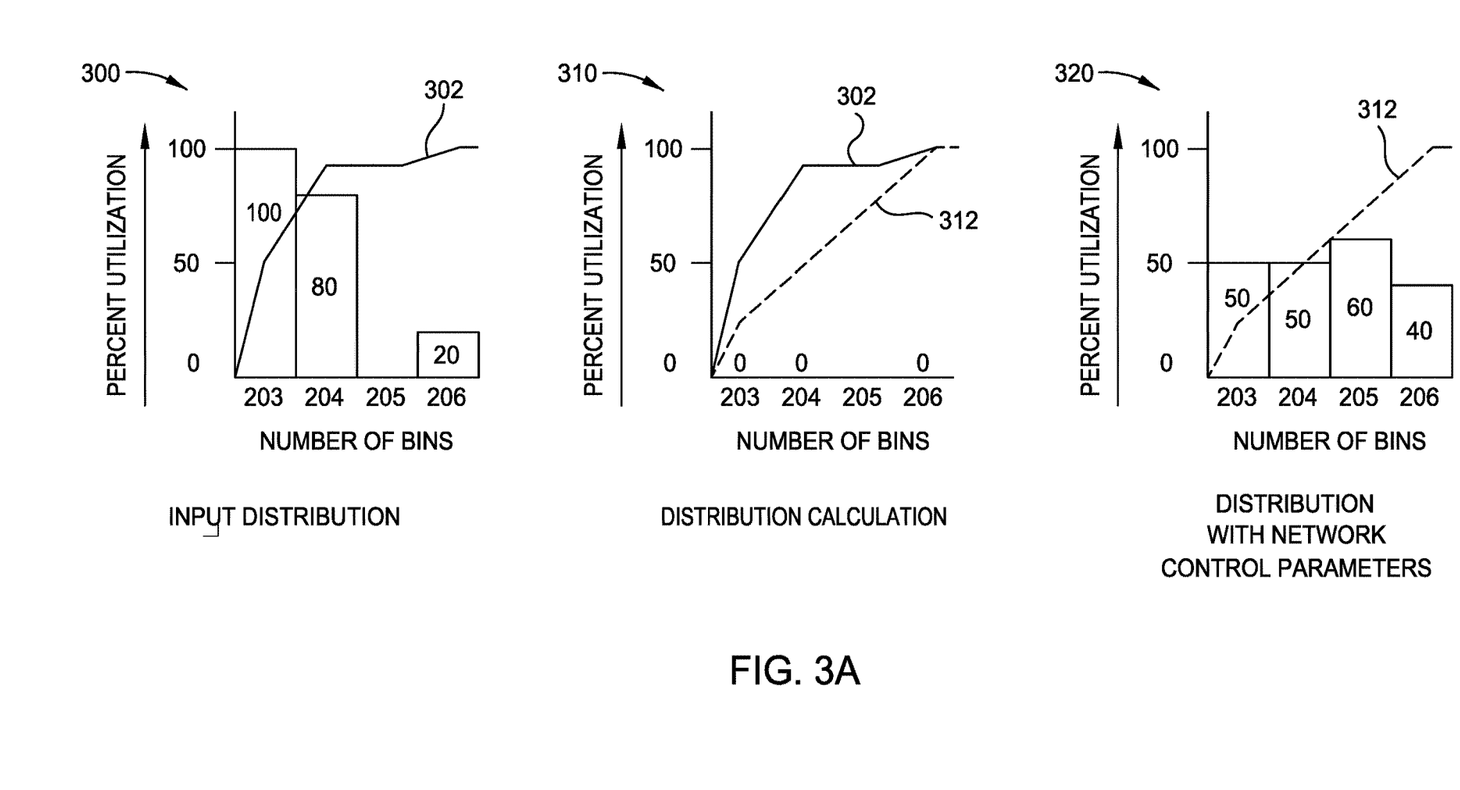
FIG. 3A illustrates various network traffic distributions, according to embodiments.

The function module 213 is combined with the distribution module 212 and a learning module 214 to implement machine learning training to compute/generate an optimized set of network control parameters 215. As described herein, the function module 213, distribution module 212, and learning module 214 perform an iterative learning/training process to determine the optimized set of network control parameters 215. For example, the network control parameters 215 may be processed through the function module 213 multiple times to train the BNN in order to provide an equalized distribution of the network traffic/network flows on the network links at the network element (as shown in FIG. 3).

Once the CIAM 110 determines the network control parameters 215 are optimized, the CIAM 110 provides the network control parameters 215 to the load distributor 250. In some examples, the network control parameters 215 are saved by CIAM 110 for use in subsequent training and optimization. As shown, the CIAM 110 provides the network control parameters 215 as control configurations 220. In some examples, the control parameters 215 are encapsulated along with other network control information into the control configurations 220. A management module 252 at the load distributor 250 receives and parses the control configurations 220 and provides the optimized network control parameters 215 to the function module 255. In some examples, the management module 252 decodes the network control parameters 215 (and other control configurations) and relays the decoded information from the management plane to the control plane. In some examples, the function module 255 is also a BNN, which functions as a feedforward processor. The BNN at the function module 255 provides a hashing function, using the network control parameters 215, for the load distributor such that the network flows are distributed on the network links 203-206.

FIG. 3A illustrates various network traffic distributions, according to embodiments. As described in relation to FIG. 2, the distribution module 212 determines one or more distribution performance models for flow distribution functions. As shown, FIG. 3A includes a distribution using normal load-balancing algorithm 300, and a distribution with optimized network control parameters 320. While described in relation to histograms, the distribution performance models may include any distribution models showing a distribution of resources. The distribution 300 is an example of a distribution of network flows over network links prior to the generation of network control parameters at the CIAM 110. As shown, the link 203 includes network flows such that 100% of its available bandwidth is utilized. Link 204 includes network flows such that 80% of its bandwidth is utilized. Links 205 and 206 are at 0% and 20% utilization, respectively. As also shown in distribution 300, the un-optimized cumulative distribution function (CDF) 302 is non-linear, which implies the network flows are unbalanced such that the network traffic is not sent from the network element as efficiently as possible. In some examples, the CDF is calculated as shown in Equation 1, where $U_l$ is the utilization of a link, such as Link l, and (N.U) l is normalized utilization of the link l:

$$CDF. = \sum_{l=1}^{N} (N.U)_l \qquad \text{Equation 1}$$

Many live network situations may result in the distribution 300. For example, as traffic shifts from one type of flow to another type of flow (e.g., business application flows to utility application flows), the hashing function distributing the network flows becomes outdated and un-optimized resulting in oversubscribed links 203 and 204, and undersubscribed links 205 and 206.

In some examples, the distribution module 212 determines an optimal CDF 312 for the network links 202-206 as shown in comparison distribution 310. As the function module 213 (BNN) and the learning module 214 determine various flow distribution function (including various network control parameters), the distribution module 212 models the flow distribution functions such that the models represent the distribution of the network flows on the links 203-206. Distribution 310 shows a model for an optimized flow function where the CDF 312 is linear (or approximately linear) as compared to CDF 302. In some examples, as shown in distribution 320, the distribution of the network flows on the network links may not result in perfectly balanced traffic (or equalized flows) since network flows do not uniformly require the same amount of network resources (e.g., bandwidth). The optimized flow distribution function provides a nearly uniform and/or optimized distribution of the network flows.

Figure 3B:
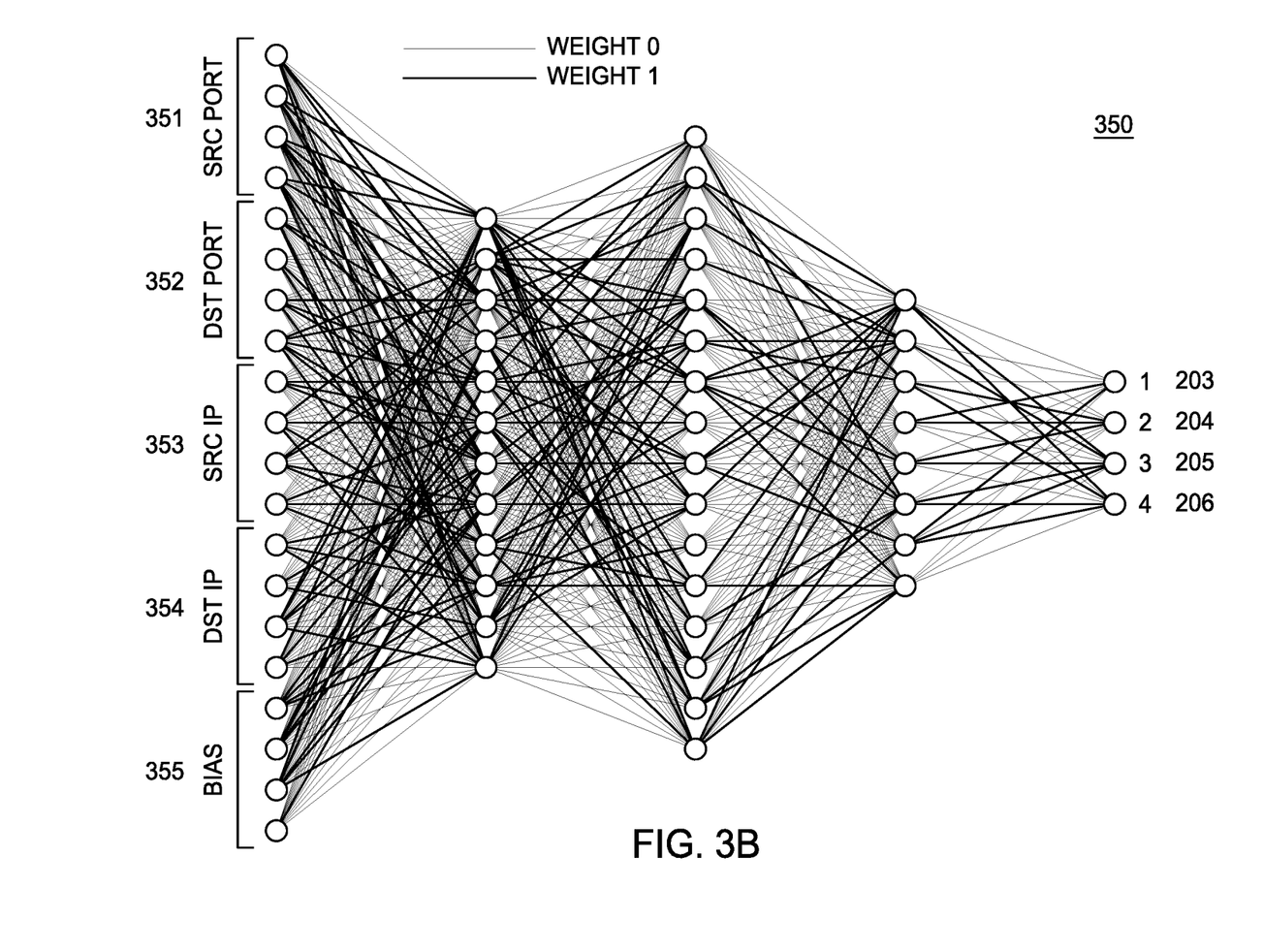
FIG. 3B illustrates a trained neural network, according to embodiments.

FIG. 3B illustrates a trained neural network, according to embodiments. For example, once the CIAM 110 has determined network control parameters 215 as described herein, a trained BNN 350 is produced, which is replicable/executable at the function module 255 using the determined network control parameters. As shown in FIG. 3B, the trained BNN 350 has various inputs including SRC port 351, DST port 352, SRC IP 353, DST IP 354, and bias value 355. According to the various inputs into the trained BNN 350, the output of the trained BNN 350 is one of the network links 203-206. In some examples, each of the inputs 351-355 ranges from 0-15. Weight 0, as shown in FIG. 3B with light lines, indicates the input undergoes an XOR an operation with 0 before sending to the next layer of the BNN. Weight 1, as shown in FIG. 3B with bold lines, indicates the input undergoes an XOR operation with 1, before sending to the next layer of the BNN.

Figure 3C:
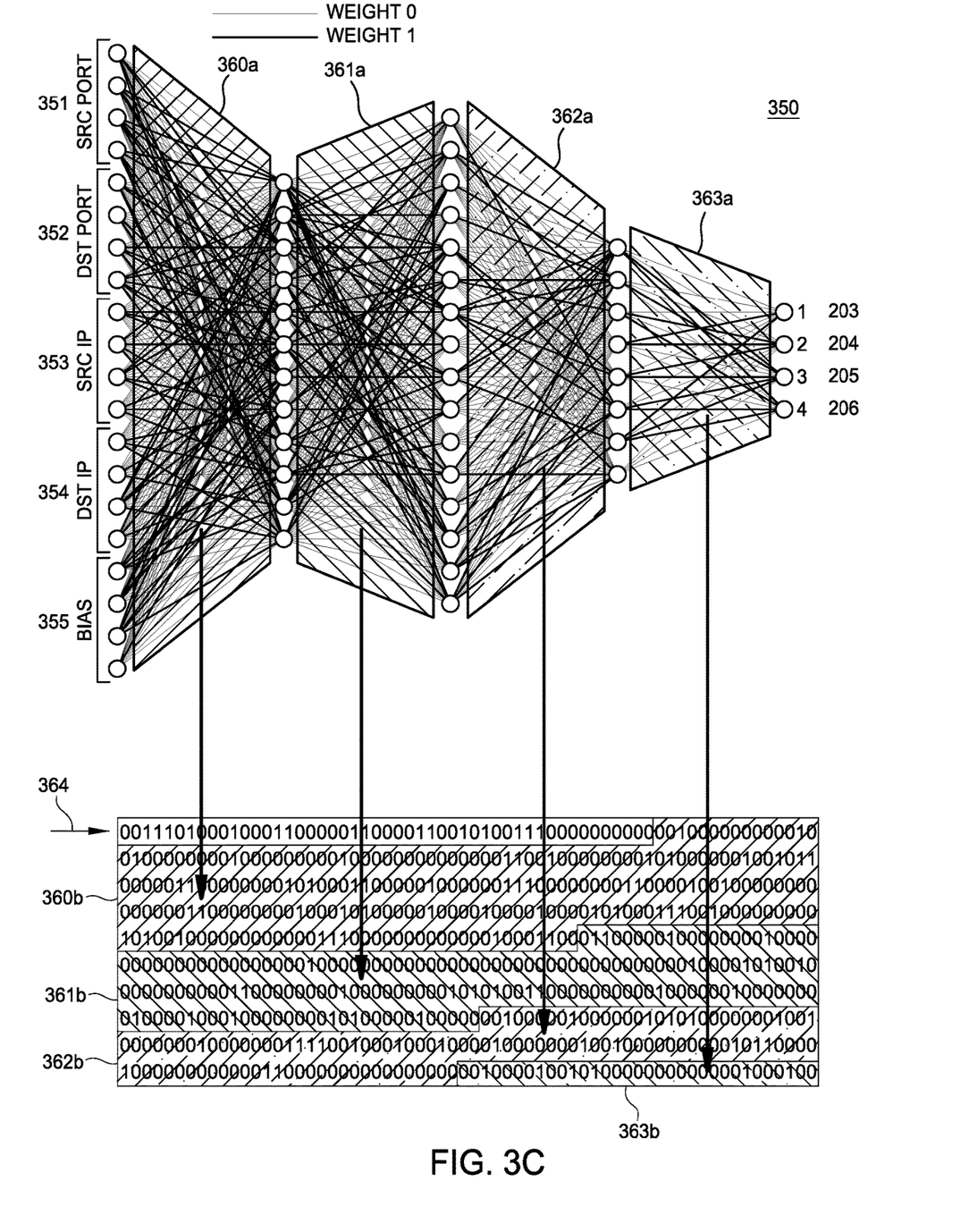
FIG. 3C illustrates a mapping of a trained neural network to network control parameters, according to embodiments.

FIG. 3C illustrates a mapping of a trained neural network to network control parameters, according to embodiments. For example, the first layer 360*a* of the BNN is mapped to a corresponding section, section 360*b*, in the binary version of the network control parameters 215. The second layer 361*a* is mapped to the section 361*b*, the third layer 362*a* is mapped to the section 362*b*, and the fourth layer 363*a* is mapped to the fourth section 363*b*. The corresponding bias inputs are mapped to the section 364. The network control parameters 215, as shown in FIG. 3B, can then be executed by the function module 255 to execute the trained BNN 350 at the load distributor module 250.

Figure 3D:
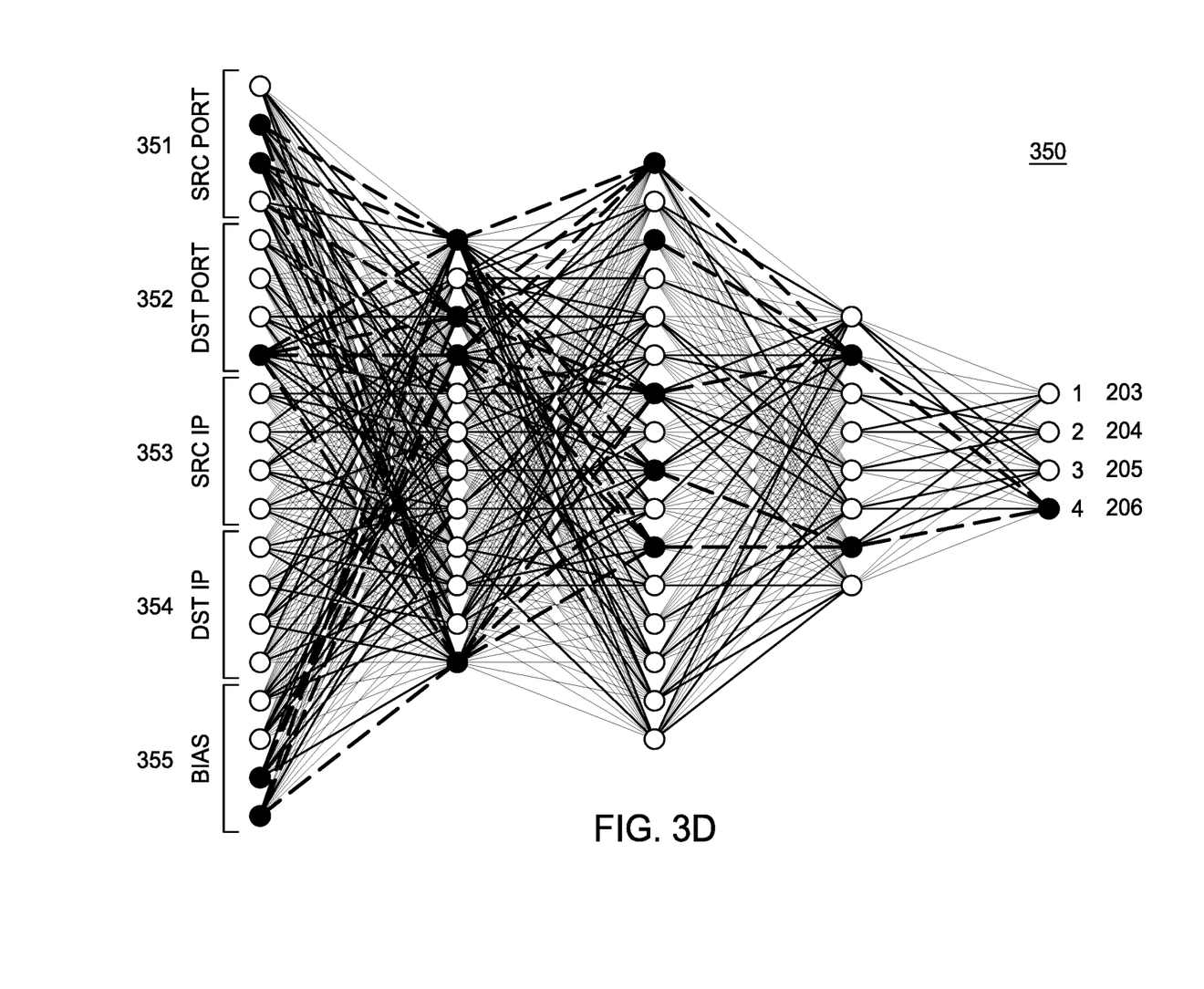
FIG. 3D illustrates an example distribution using a trained neural network, according to embodiments.

FIG. 3D illustrates an example distribution using a trained neural network, according to embodiments. As shown in the example in FIG. 3D, the SRC port value=6, DST PORT value=1, the SRC IP value is not used and the DST IP value is also not used. The bias value is used to indicate that the trained BNN 350 is only using SRC PORT and DST PORT. As shown, the taken paths of the trained BNN 350 propagates through the BNN layers to the output, where link 4, network link 206, is selected for packet distribution.

Figure 3E:
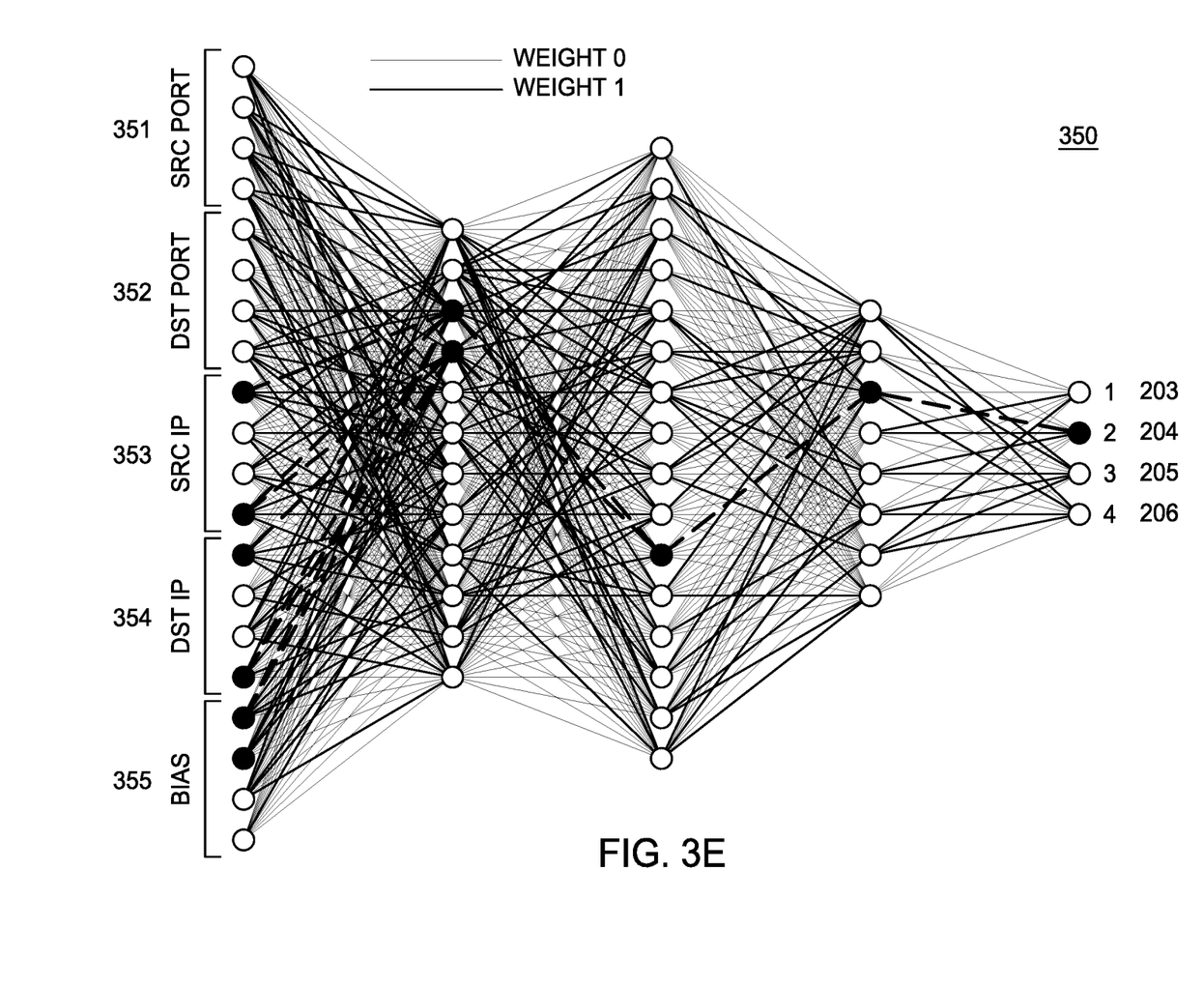
FIG. 3E illustrates an example distribution using a trained neural network, according to embodiments.

FIG. 3E illustrates another example distribution using a trained neural network, according to embodiments. As shown in the example in FIG. 3D, the SRC port value is not used, the DST PORT value is also not used, the SRC IP value=9, and the DST IP value=9. The BIAS value is used to indicate that the trained BNN 350 is only using SRC IP and DST IP. As shown, the taken paths of the trained BNN 350 propagates through the BNN layers to the output, where link 2, network link 204 is selected for packet distribution.

Figure 3F:
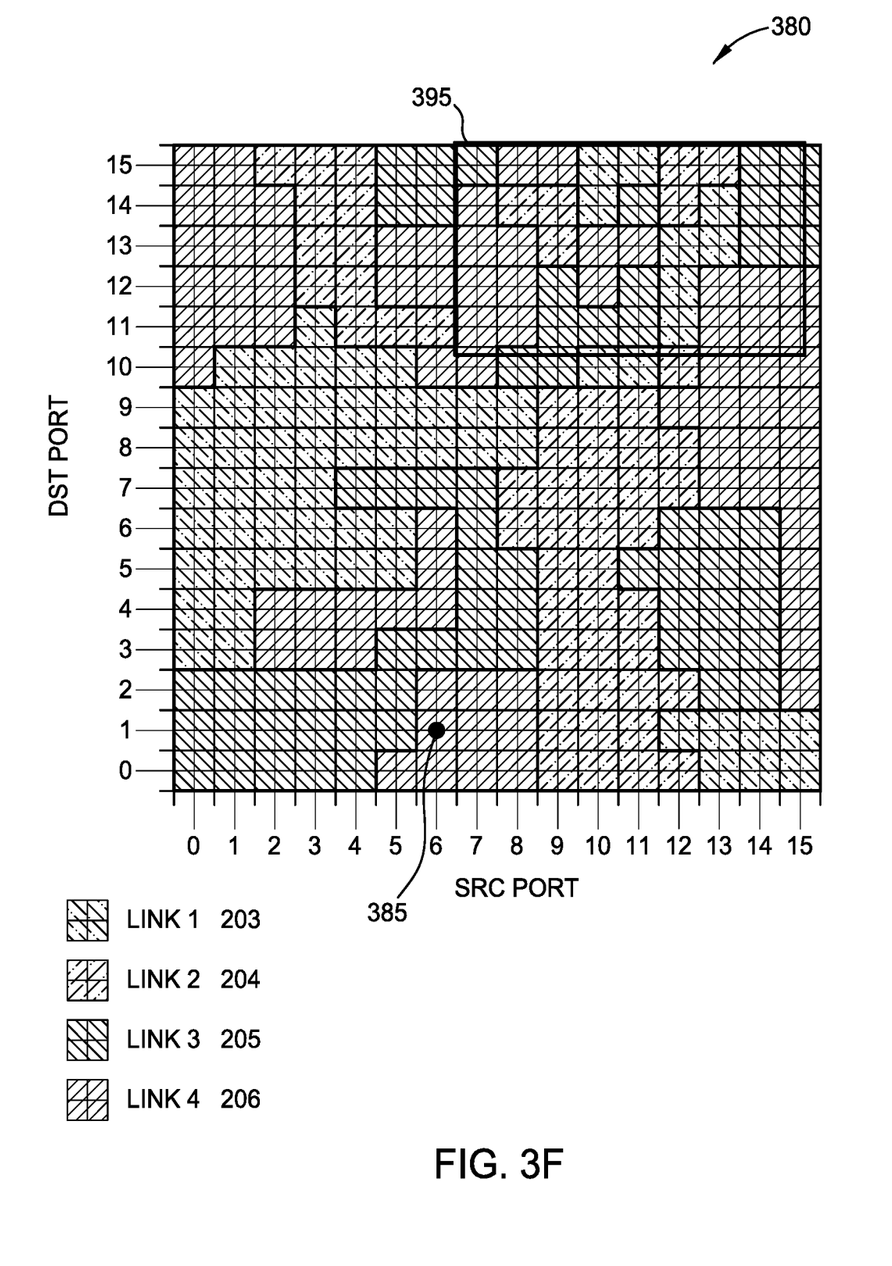
FIG. 3F illustrates a decision boundary diagram for a trained neural network, according to embodiments.

FIG. 3F illustrates a decision boundary diagram for a trained neural network, according to embodiments. For example, the diagram 380 illustrates typical outcomes expected for the given inputs in the DST port inputs 352 and the SRC port inputs 351 for the trained BNN 350. For example, as discussed in relation to FIG. 3D, for SRC port value=6, DST PORT value=1 the outcome point 385 would be expected, which would select link 4, network link 206. In some examples, area 395 of the diagram 380 includes smaller area granules in the decision boundary distribution. In some examples, the smaller granules are expected when the neural network is not trained well to hash SRC PORT and DST PORT combinations lying in that region. In some examples, this is due to lower traffic flowing through the given SRC PORT and DST PORT combinations. Once the traffic flow increases, the trained BNN 350 may be retrained to better select a network link for those combinations, as described herein.

Figure 4:
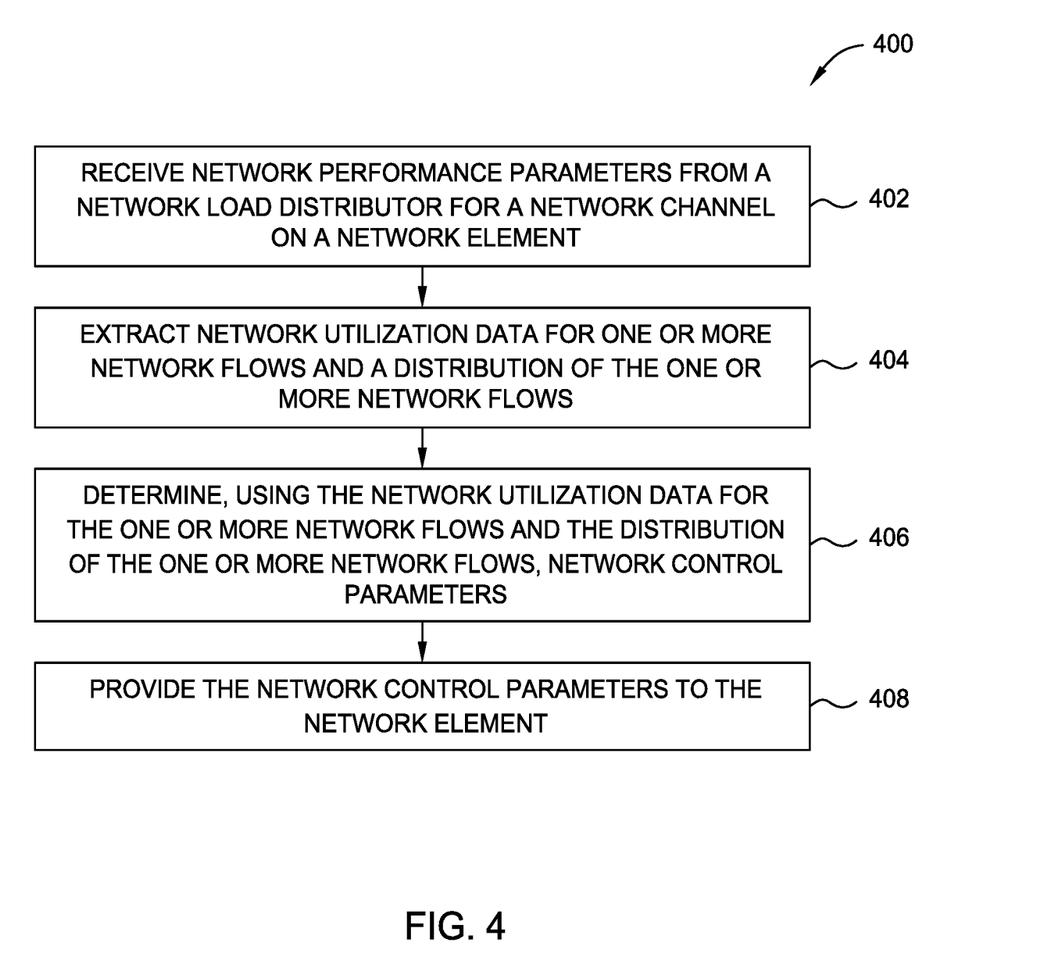
FIGS. 4-5 are methods for customizable network traffic distribution at a network controller, according to embodiments.

FIG. 4 is a method for customizable network traffic distribution at a network controller. Method 400 begins at block 402, where the CIAM 110, receives network performance parameters from a network load distributor for a network channel on a network element. In some examples, the process of sending the network performance parameters from the network load distributor to the CIAM 110 is executed based on the detection of a network imbalance at the network load distributor, according to a set time period tracked by a timer and/or a user input/interrupt received by the network load distributor. In some examples, the network performance parameters includes packet capture data, netflow data, and/or telemetry data collected at the network element (e.g., collected by the performance module 251). In some examples, the method 400 is initiated when an imbalance of the network resource is detected or is likely to occur at the network element. For example, the method 400 is performed in response to a reconfiguration trigger which initiates the process to ensure that the network traffic is evenly distributed across the network links at the network element. In some examples, the reconfiguration trigger includes an imbalance determination. The imbalance is detected either at the network element and/or at the network controller based on the network performance parameters. The reconfiguration trigger can also include a timer, such that the network control parameters are adapted and updated at regular time intervals. The reconfiguration trigger can also include a user interrupt such as when a user (e.g., a network administrator) initiates an update to the network control parameters.

At block 404, the CIAM 110 including extraction module 211, extracts, from the network performance parameters, network utilization data for one or more network flows and a distribution of the one or more network flows on one or more network links of the network channel.

At block 406, the CIAM 110, determines network control parameters using a learning network distribution approximation function (e.g., function module 213) on the network controller and using the network utilization data for the one or more network flows and the distribution of the one or more network flows. In some examples, the learning network distribution approximation function includes a BNN paired with a learning algorithm, such as learning module 214. In some examples, the network control parameters provide an optimized distribution of the one or more network flows on the on the one or more network links when implemented by a network distribution approximation function (function module 255) at the network element. This process is discussed in more detail in relation to FIG. 5. In some examples, this process is repeated for each network channel on the network element. For example, if a network element includes multiple Etherchannels, individual/custom network control parameters are determined for each Etherchannel on the network element using network performance parameters for each of the Etherchannels.

At block 408, the network controller 105, provides the network control parameters to the network element. In some examples, the network controller 105 compresses the network control parameters into a bit stream and transmits the bit stream from the network controller to the load distributor 250 in the network element via the control Configurations 220.

Figure 5:
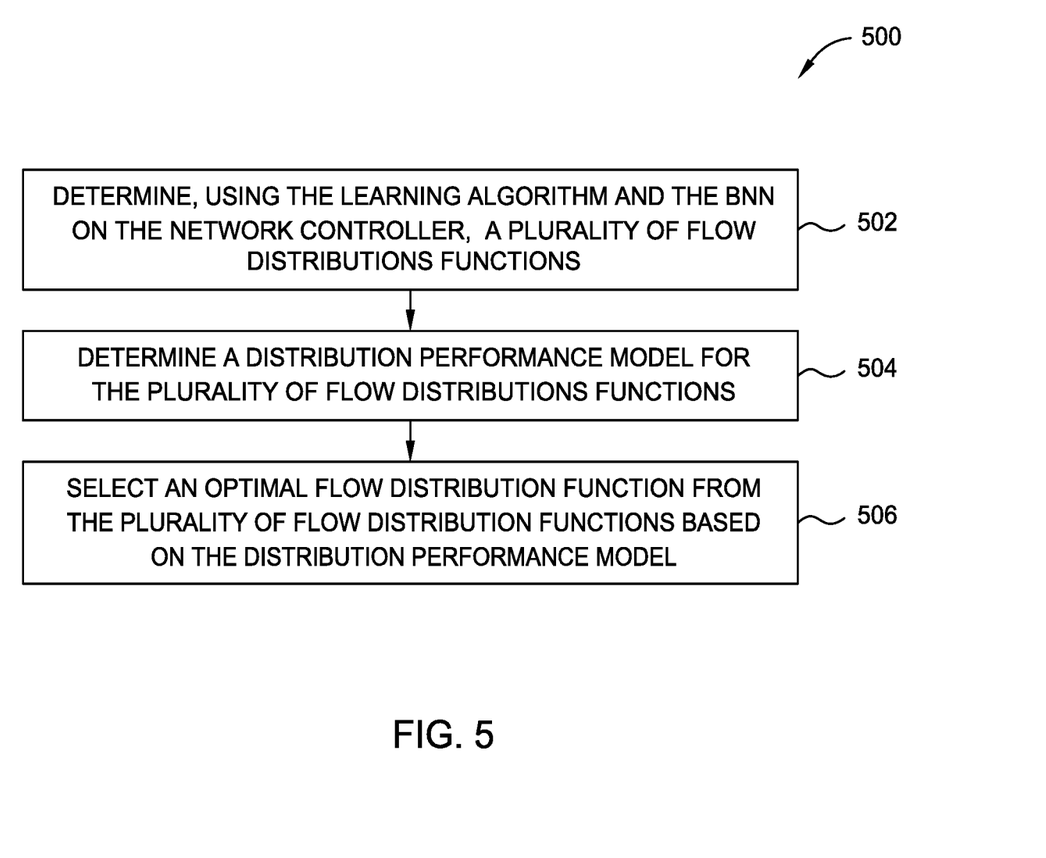

FIG. 5 is a method for determining network control parameters which can correspond to block 406 of the method 400. Method 500 begins at block 502, where the CIAM 110, including the function module 213 and the learning algorithm 214, determines a plurality of flow distributions functions.

At block 504, the CIAM 110 including the distribution module 212 determines a distribution performance model for the plurality of flow distributions functions. For example, the CIAM 110 uses a mean square error between flow distribution functions and a theoretical distribution, modeled by the CDF 312, to compare different distribution functions and uses a distribution function which minimizes the mean square error.

At block 506, the CIAM 110 including the learning module 214 selects an optimal flow distribution function from the plurality of flow distribution functions based on the distribution performance model. In some examples, the selected optimal flow distribution function provides an equal distribution of the one or more network flows on the one or more network links.

Figure 6:
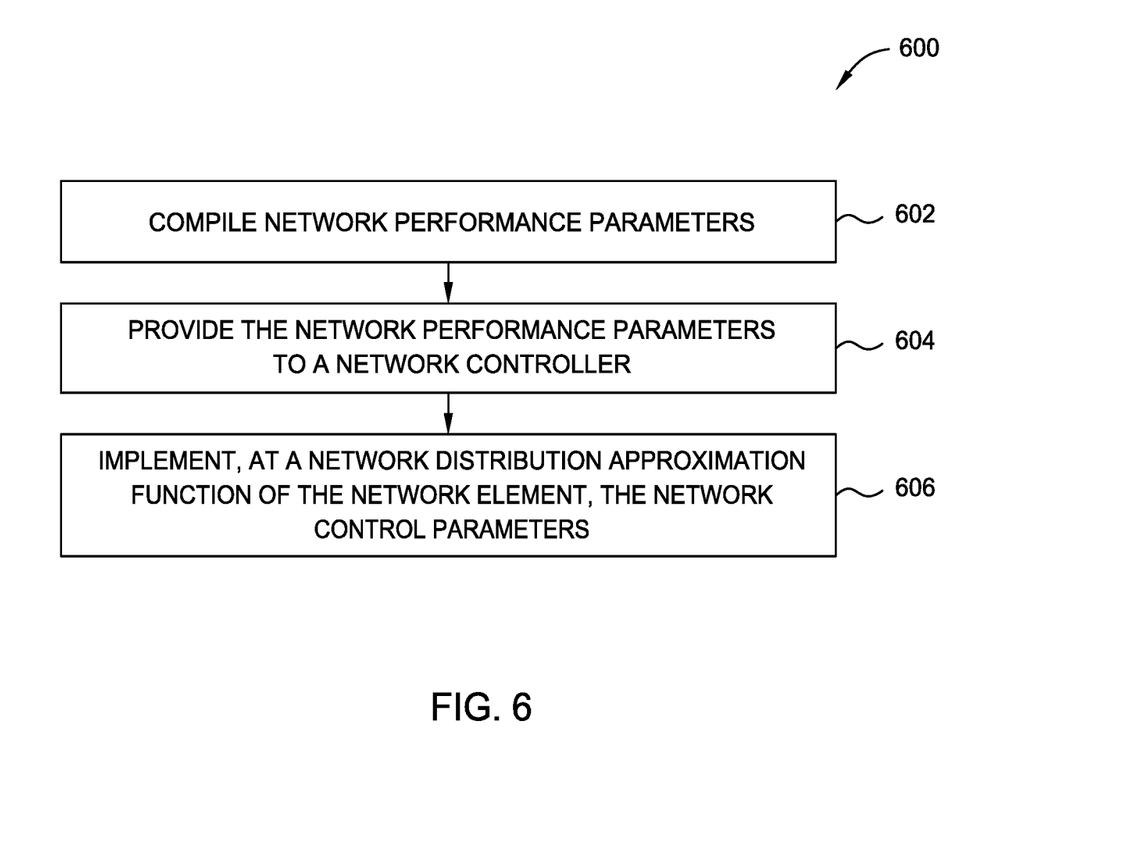
FIG. 6 is a method customizable network traffic distribution at a network element, according to one embodiment.

FIG. 6 is a method for customizable network traffic distribution at a network element, according to one embodiment. Method 600 begins at block 602, where the network element, including load distributor module 250 and performance module 251 compiles network performance parameters comprising network utilization data for one or more network flows and a distribution of the one or more network flows on one or more network links of a network channel. In some examples, the network performance parameters include packet capture data, netflow data, and/or telemetry data for the network flows.

At block 604, the performance module 251 provides the network performance parameters to a network controller. In some examples, the performance module 251 provides the network performance parameters to the network controller in response to a determination of imbalance at the load distributor (e.g., one or more network links are overloaded or undersubscribed). For example, if variance in distribution crosses a pre-configured or predefined threshold, the load distributor is considered imbalanced. In some examples, the performance module 251 provides the network performance parameters to the network controller in response to an expired timer indicating updated network control parameters are needed and/or a user interrupt from a network administrator. In one example, the network parameters are a bit stream where the function module 255 executes the bit stream as distribution instructions.

At block 606, the load distributor module 250 including the function module 255 implements the network control parameters, where the network control parameters provide an optimized distribution of the one or more network flows on the on the one or more network links. For example, a BNN, at the function module 255 executing as the network distribution approximation function, distributes the network flows received at the load distributor on the network links 203-206 according to the network control parameters 215 determined at the network controller, thus providing equalized/optimal distribution of the network flows on the network links. In some examples, the BNN may also utilized other input data about the flow parameters such as SRC IP, DST IP, etc. to provide an optimal distribution.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system."

Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., the congestion control module) or related data available in the cloud. For example, the congestion control module could execute on a computing system in the cloud. Doing so allows a user to access this information from any computing system attached to a network connected to the cloud (e.g., the Internet).

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method comprising:
   receiving, at a network controller, network performance parameters from a network load distributor for a network channel on a network element;
   extracting, from the network performance parameters, network utilization data for one or more network flows and a distribution of the one or more network flows on one or more network links of the network channel;
   determining network control parameters using (i) a learning neural network distribution approximation function comprising a bitwise neural network (BNN) with a learning algorithm on the network controller and using (ii) the network utilization data for the one or more network flows and the distribution of the one or more network flows-herein the network control parameters are determined by:
      determining, using the learning algorithm and the BNN on the network controller, a plurality of flow distributions functions;
      determining a distribution performance model for the plurality of flow distributions functions; and
      selecting, using the learning neural network distribution approximation function, one of the plurality of flow distribution functions based on the distribution performance model, wherein the selected flow distribution function provides an equal distribution of the one or more network flows on the one or more network links,
   where the network control parameters implement the selected flow distribution function and provide an optimized distribution of the one or more network flows on the on the one or more network links when implemented by a network distribution approximation function at the network element; and
   providing the network control parameters to the network element.

2. The method of claim 1, wherein the network distribution approximation function on the network element comprises a BNN.

3. The method of claim 2, wherein providing the network control parameters to the network element comprises:
   compressing the network control parameters into a bit stream; and
   transmitting the bit stream from the network controller to the network load distributor in the network element.

4. The method claim 1, wherein the network performance parameters comprises network monitoring data collected at the network element comprising one or more of:
   packet capture data;
   netflow data; and
   telemetry data.

5. The method of claim 1, wherein the network element comprises a plurality of network channels, the method further comprising:
   determining individual network control parameters for the plurality of network channels based on received network performance parameters for each network channel.

6. The method of claim 1, wherein the method is performed in response to a reconfiguration trigger, wherein the reconfiguration trigger comprises one or more of:
- an imbalance determination;
- a timer; and
- a user interrupt.

7. A system comprising:
- one or more computer processors; and
- a memory containing a program which when executed by the one or more computer processors performs an operation comprising:
  - receiving, at a network controller, network performance parameters from a network load distributor for a network channel on a network element;
  - extracting, from the network performance parameters, network utilization data for one or more network flows and a distribution of the one or more network flows on one or more network links of the network channel;
  - determining network control parameters using (i) a learning neural network distribution approximation function comprising a bitwise neural network (BNN) with a learning algorithm on the network controller and using (ii) the network utilization data for the one or more network flows and the distribution of the one or more network flows, wherein the network control parameters are determined by:
    - determining, using the learning algorithm and the BNN on the network controller, a plurality of flow distributions functions;
    - determining a distribution performance model for the plurality of flow distributions functions; and
    - selecting, using the learning neural network distribution approximation function, one of the plurality of flow distribution functions based on the distribution performance model, wherein the selected flow distribution function provides an equal distribution of the one or more network flows on the one or more network links,
  - where the network control parameters implement the selected flow distribution function and provide an optimized distribution of the one or more network flows on the on the one or more network links when implemented by a network distribution approximation function at the network element; and
  - providing the network control parameters to the network element.

8. The system of claim 7, wherein the network distribution approximation function on the network element comprises a BNN.

9. The system of claim 8, wherein providing the network control parameters to the network element comprises:
- compressing the network control parameters into a bit stream; and
- transmitting the bit stream from the network controller to the network load distributor in the network element.

10. The system of claim 7, wherein the network performance parameters comprises network monitoring data collected at the network element comprising one or more of:
- packet capture data;
- netflow data; and
- telemetry data.

11. The system of claim 7, wherein the network element comprises a plurality of network channels, the operation further comprising:
- determining individual network control parameters for the plurality of network channels based on received network performance parameters for each network channel.

12. The system of claim 7, wherein the operation is performed in response to a reconfiguration trigger, wherein the reconfiguration trigger comprises one or more of:
- an imbalance determination;
- a timer; and
- a user interrupt.

13. A method comprising:
- compiling, at a network element, network performance parameters comprising network utilization data for one or more network flows and a distribution of the one or more network flows on one or more network links of a network channel;
- providing the network performance parameters to a network controller;
- receiving network control parameters from the network controller, wherein the network control parameters comprise at least one network control parameter to implement a flow distribution function selected from a plurality of flow distribution functions, wherein the plurality of flow distribution functions are determined using a bitwise neural network (BNN) with a learning algorithm and are based on a distribution performance model generated at the network controller, wherein the flow distribution function provides an equal distribution of the one or more network flows on the one or more network links; and
- implementing, at a neural network distribution approximation function of the network element, the network control parameters, where the network control parameters provide an optimized distribution of the one or more network flows on the one or more network links.

14. The method of claim 13, wherein the neural network distribution approximation function of the network element comprises a bitwise neural network (BNN), and wherein implementing the network control parameters provides a hashing distribution algorithm for the one or more network flows on the one or more network links.

15. The method of claim 13, wherein the network performance parameters comprise one or more of:
- packet capture data;
- netflow data; and
- telemetry data.

16. The method of claim 13, wherein providing the network performance parameters to the network controller is performed in response to one or more of:
- an imbalance determination;
- a timer; and
- a user interrupt.

17. The method of claim 13, wherein the network element comprises a plurality of network channels, the method further comprising implementing individual network control parameters for the plurality of network channels.

18. The method of claim 13, wherein the network control parameters comprise a bit stream, wherein the neural network distribution approximation function of the network element executes the bit stream as distribution instructions.

* * * * *

UNITED STATES PATENT AND TRADEMARK OFFICE
CERTIFICATE OF CORRECTION

PATENT NO. : 11,063,837 B2
APPLICATION NO. : 16/203372
DATED : July 13, 2021
INVENTOR(S) : Prathamesh R. Karve et al.

It is certified that error appears in the above-identified patent and that said Letters Patent is hereby corrected as shown below:

On the Title Page

On the page 2, in Column 1, item (56) under "Other Publications", Line 4, delete "Virtulization-enabled" and insert -- Virtualization-enabled --, therefor.

On the page 2, in Column 1, item (56) under "Other Publications", Line 8, delete "managearXiv:" and insert -- manage arXiv: --, therefor.

On the page 2, in Column 1, item (56) under "Other Publications", Line 11, delete "withWeights" and insert -- with Weights --, therefor.

In the Specification

In Column 3, Line 1, delete "on the on the" and insert -- on the --, therefor.

In Column 3, Line 21, delete "on the on the" and insert -- on the --, therefor.

In Column 8, Line 32, delete "on the on the" and insert -- on the --, therefor.

In Column 8, Line 48, delete "Configurations" and insert -- configurations --, therefor.

In Column 9, Line 35, delete "on the on the" and insert -- on the --, therefor.

In the Claims

In Column 12, Line 24, in Claim 1, delete "flows-herein" and insert -- flows, wherein --, therefor.

In Column 12, Line 41, in Claim 1, delete "on the on the" and insert -- on the --, therefor.

Signed and Sealed this
Fourteenth Day of December, 2021

Drew Hirshfeld
*Performing the Functions and Duties of the*
*Under Secretary of Commerce for Intellectual Property and*
*Director of the United States Patent and Trademark Office*

In Column 12, Line 55, in Claim 4, after "method" insert -- of --.

In Column 13, Line 44, in Claim 7, delete "on the on the" and insert -- on the --, therefor.